United States Patent
Sinclair

(10) Patent No.: US 8,205,063 B2
(45) Date of Patent: Jun. 19, 2012

(54) DYNAMIC MAPPING OF LOGICAL RANGES TO WRITE BLOCKS

(75) Inventor: Alan W. Sinclair, Falkirk (GB)

(73) Assignee: Sandisk Technologies Inc., Plano, TX (US)

( * ) Notice: Subject to any disclaimer, the term of this patent is extended or adjusted under 35 U.S.C. 154(b) by 464 days.

(21) Appl. No.: 12/346,433

(22) Filed: Dec. 30, 2008

(65) Prior Publication Data

US 2010/0169542 A1 Jul. 1, 2010

(51) Int. Cl.
*G06F 12/00* (2006.01)
(52) U.S. Cl. ............ 711/172; 711/103; 711/E12.005; 711/E12.013
(58) Field of Classification Search .......... 711/209, 711/170, 172, 202, 203, E12.005, E12.013, 711/103
See application file for complete search history.

(56) References Cited

U.S. PATENT DOCUMENTS

| | | | |
|---|---|---|---|
| 6,480,936 B1 | 11/2002 | Ban et al. | |
| 6,678,785 B2 | 1/2004 | Lasser | |
| 6,725,328 B2 * | 4/2004 | Kano et al. ............ | 711/112 |
| 7,110,373 B2 * | 9/2006 | Lee .................. | 711/170 |
| 7,139,864 B2 | 11/2006 | Bennett et al. | |
| 7,734,864 B2 * | 6/2010 | Maeda et al. ......... | 711/103 |
| 2002/0099904 A1 | 7/2002 | Conley | |
| 2002/0129192 A1 * | 9/2002 | Spiegel et al. ......... | 711/103 |
| 2003/0164745 A1 | 9/2003 | Takamine | |
| 2005/0273551 A1 | 12/2005 | Keays | |
| 2006/0184723 A1 | 8/2006 | Sinclair et al. | |
| 2007/0174582 A1 * | 7/2007 | Feldman ............. | 711/202 |
| 2008/0307158 A1 | 12/2008 | Sinclair | |
| 2008/0307192 A1 | 12/2008 | Sinclair et al. | |
| 2009/0055620 A1 * | 2/2009 | Feldman et al. ........ | 711/202 |
| 2009/0164745 A1 | 6/2009 | Sinclair et al. | |
| 2010/0169588 A1 | 7/2010 | Sinclair | |

OTHER PUBLICATIONS

Office Action issued in U.S. Appl. No. 12/346,451, dated Mar. 19, 2011 (8 pages).
Office Action issued in U.S. Appl. No. 11/963,413, dated Jul. 25, 2011 (16 pages).
Office Action issued in U.S. Appl. No. 11/963,413, dated Jan. 14, 2011 (15 pages).

* cited by examiner

*Primary Examiner* — Pierre-Michel Bataille
(74) *Attorney, Agent, or Firm* — Brinks Hofer Gilson & Lione

(57) ABSTRACT

A method and system writes data to a memory device including dynamic assignment of logical block addresses (LBAs) to physical write blocks. The method includes receiving a request to write data for a logical block address within an LBA range to the memory device. The method assigns the LBA range to a particular write block exclusively or non-exclusively, depending on the existence of previously assigned write blocks and the availability of unwritten blocks. A data structure may be utilized to record the recent usage of blocks for assigning non-exclusive write blocks. An intermediate storage area may be included that implements the dynamic assignment of LBA ranges to physical write blocks. Data in the intermediate storage area may be consolidated and written to the main storage area. Lower fragmentation and write amplification ratios may result by using this method and system.

22 Claims, 8 Drawing Sheets

DYNAMIC MAPPING OF LOGICAL RANGES TO WRITE BLOCKS

TECHNICAL FIELD

This application relates generally to memory devices. More specifically, this application relates to dynamically mapping logical addresses to physical addresses in reprogrammable non-volatile semiconductor flash memory.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. When writing data to a conventional flash memory system, a host typically writes data to, and reads data from, addresses within a logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system generally operates without knowledge of this mapping.

A drawback of memory systems that operate in a logical address space, also referred to as logical block address (LBA) format, is fragmentation. Data written by a host file system may often be fragmented in logical address space, where many fixed logical groups are only partially updated with new data. The fragmentation may occur as a result of cumulative fragmentation of free space by the host file system, and possibly even as a result of inherent fragmentation of individual files by the host file system. Data previously written may become obsolete due to deletion and cause further fragmentation. The fragmented logical groups will need to be rewritten in full in a different physical block. The process of rewriting the fragmented logical groups may involve copying unrelated data from the prior location of the logical group.

Fragmentation may also increase if data is written randomly followed by data written sequentially in the logical address space. The increased fragmentation may result in a higher than desired write amplification ratio, i.e., the ratio of the amount of data programmed, including internal copying/movement of data, relative to the amount of data written by a host. The overhead due to the increased fragmentation and write amplification ratio can result in lower performance and reduced device lifetime for the memory system.

SUMMARY

In order to address the problems noted above, a method and system for dynamically mapping logical ranges to physical write blocks is disclosed.

According to a first aspect of the invention, a method is disclosed for writing data to a memory device including a plurality of memory blocks. The method includes receiving a request to write the data to the memory device, where the data has a logical block address (LBA) within a first LBA range. The method also includes determining whether a first assigned block exists in the plurality of memory blocks where the first assigned block is assigned for writing data for the first LBA range. If the first assigned block does not exist and an unwritten block is not available, then a second assigned block is identified. The second assigned block is previously assigned for writing data for a second LBA range. The second assigned block is assigned to also write data for the first LBA range, and the data is written to the second assigned block. Identifying the second assigned block may include identifying a least recently used block.

A data structure may be utilized to record the memory blocks in order of recent usage, and for identifying a block that is least recently used. Data written using this method may be from a host or for a garbage collection operation. Another data structure may be utilized to record the assignments of blocks to the LBA ranges. This data structure may be updated when a block is assigned or if the second assigned block is assigned for writing data for both the first and second LBA ranges. The method may also include writing the data to an intermediate storage area. In this case, the data in the intermediate storage area may be consolidated then written to a main storage area. The method may further include determining if the data is apportioned in multiple contiguous LBA ranges. If the data is in multiple portions, the blocks may be assigned and the data written in an iterative process for each portion.

According to another aspect, a memory device includes a plurality of memory blocks and a controller. The controller is configured to receive a request to write the data to the memory device, where the data has a logical block address (LBA) within a first LBA range. The controller is also configured to determine whether a first assigned block exists in the plurality of memory blocks where the first assigned block is assigned for writing data for the first LBA range. If the first assigned block does not exist and an unwritten block is not available, then a second assigned block is identified. The second assigned block is previously assigned for writing data for a second LBA range. The second assigned block is assigned to also write data for the first LBA range, and the data is written to the second assigned block. Identifying the second assigned block may include identifying a least recently used block.

A data structure may be included in the memory device for recording the memory blocks in order of recent usage and for identifying a block that is least recently used. Data written to this memory system may be from a host or for a garbage collection operation. Another data structure in the memory device may include a record of the assignments of blocks to the LBA ranges. This data structure may be updated when a block is assigned or if the second assigned block is assigned for writing data for both the first and second LBA ranges. The memory device may also include an intermediate storage area for writing the data. In this case, the data in the intermediate storage area may be consolidated then written to a main storage area. The controller may further be configured to determine if the data is apportioned in multiple contiguous LBA ranges. If the data is in multiple portions, the blocks may be assigned and the data written in an iterative process for each portion.

BRIEF DESCRIPTION OF THE PRESENTLY PREFERRED EMBODIMENTS

Figure 1:
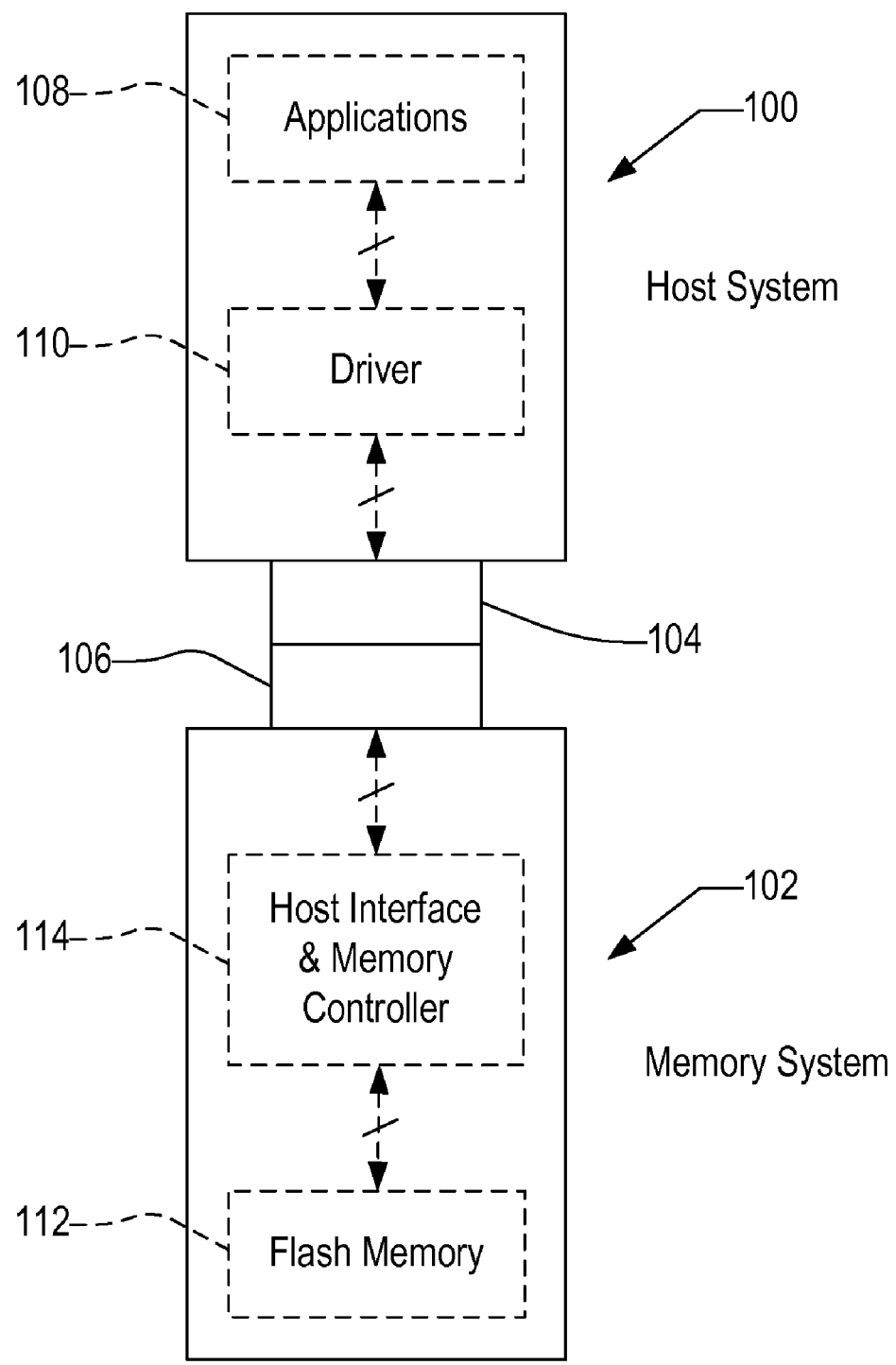
FIG. 1 is a block diagram of a host connected with a memory system having non-volatile memory.
Figure 2:
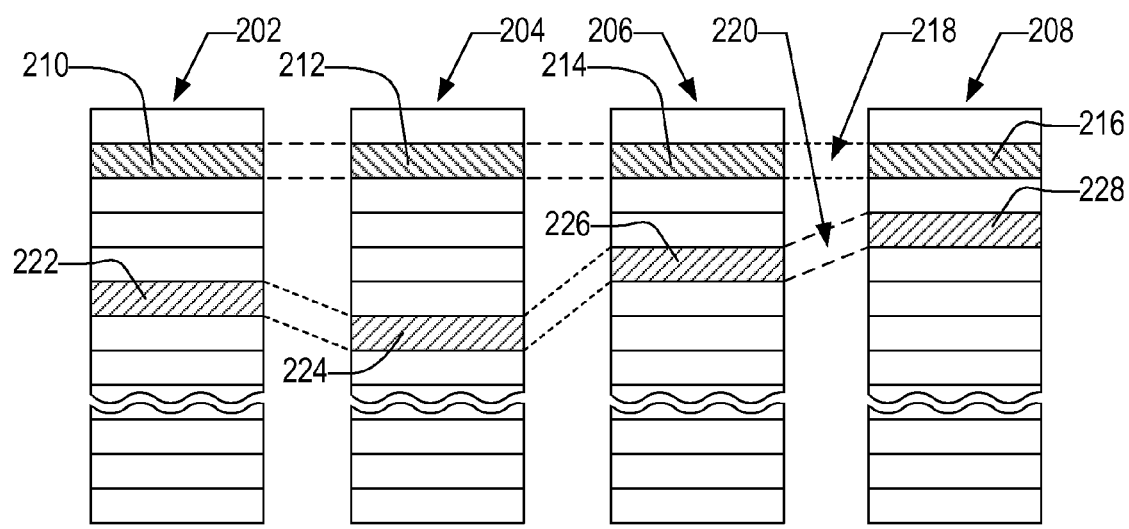
FIG. 2 illustrates an example physical memory organization of the system of FIG. 1.
Figure 3:
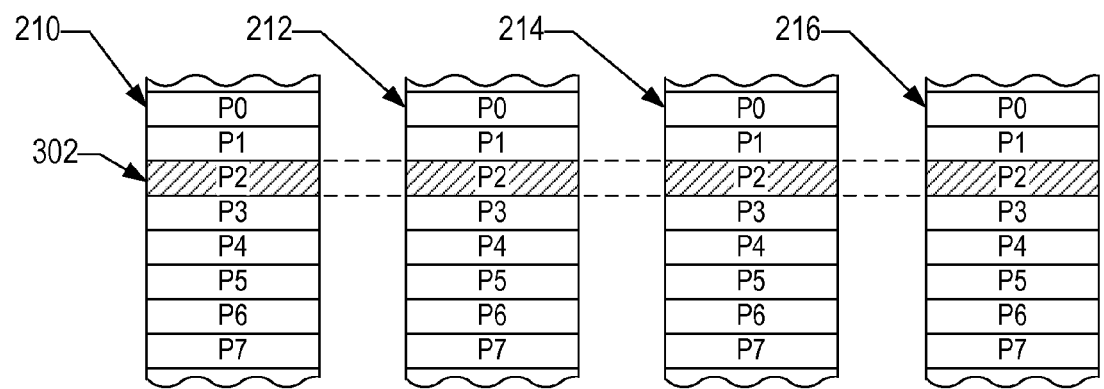
FIG. 3 shows an expanded view of a portion of the physical memory of FIG. 2.

A flash memory system suitable for use in implementing aspects of the invention is shown in FIGS. 1-3. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory 102 is concerned, made up of a combination of circuitry and software. They are an applications portion 108 and a driver portion 110 that interfaces with the memory 102. In a PC, for example, the applications portion 108 can include a processor running word processing, graphics, control or other popular application software. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1 includes flash memory 112, and circuits 114 that both interface with the host to which the card is connected for passing data back and forth and control the memory 112. The controller 114 typically converts between logical addresses of data used by the host 100 and physical addresses of the memory 112 during data programming and reading.

FIG. 2 conceptually illustrates an organization of the flash memory cell array 112 (FIG. 1) that is used as an example in further descriptions below. The flash memory cell array 112 may include multiple memory cell arrays which are each separately controlled by a single or multiple memory controllers 114. Four planes or sub-arrays 202, 204, 206, and 208 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as erase blocks. Erase blocks of memory cells are shown in FIG. 2 by rectangles, such as erase blocks 210, 212, 214, and 216, located in respective planes 202, 204, 206, and 208. There can be dozens or hundreds of erase blocks in each plane.

As mentioned above, the erase block of memory cells is the unit of erase, the smallest number of memory cells that are physically erasable together. For increased parallelism, however, the erase blocks are operated in larger metablock units. One erase block from each plane is logically linked together to form a metablock. The four erase blocks 210, 212, 214, and 216 are shown to form one metablock 218. All of the cells within a metablock are typically erased together. The erase blocks used to form a metablock need not be restricted to the same relative locations within their respective planes, as is shown in a second metablock 220 made up of erase blocks 222, 224, 226, and 228. Although it is usually preferable to extend the metablocks across all of the planes, for high system performance, the memory system can be operated with the ability to dynamically form metablocks of any or all of one, two or three erase blocks in different planes. This allows the size of the metablock to be more closely matched with the amount of data available for storage in one programming operation.

The individual erase blocks are in turn divided for operational purposes into pages of memory cells, as illustrated in FIG. 3. The memory cells of each of the blocks 210, 212, 214, and 216, for example, are each divided into eight pages P0-P7. Alternatively, there may be 16, 32 or more pages of memory cells within each block. The page is the unit of data programming and reading within an erase block, containing the minimum amount of data that are programmed or read at one time. However, in order to increase the memory system operational parallelism, such pages within two or more erase blocks may be logically linked into metapages. A metapage 302 is illustrated in FIG. 3, being formed of one physical page from each of the four erase blocks 210, 212, 214, and 216. The metapage 302, for example, includes the page P2 in each of the four blocks but the pages of a metapage need not necessarily have the same relative position within each of the blocks. A metapage is the maximum unit of programming.

Figure 4:
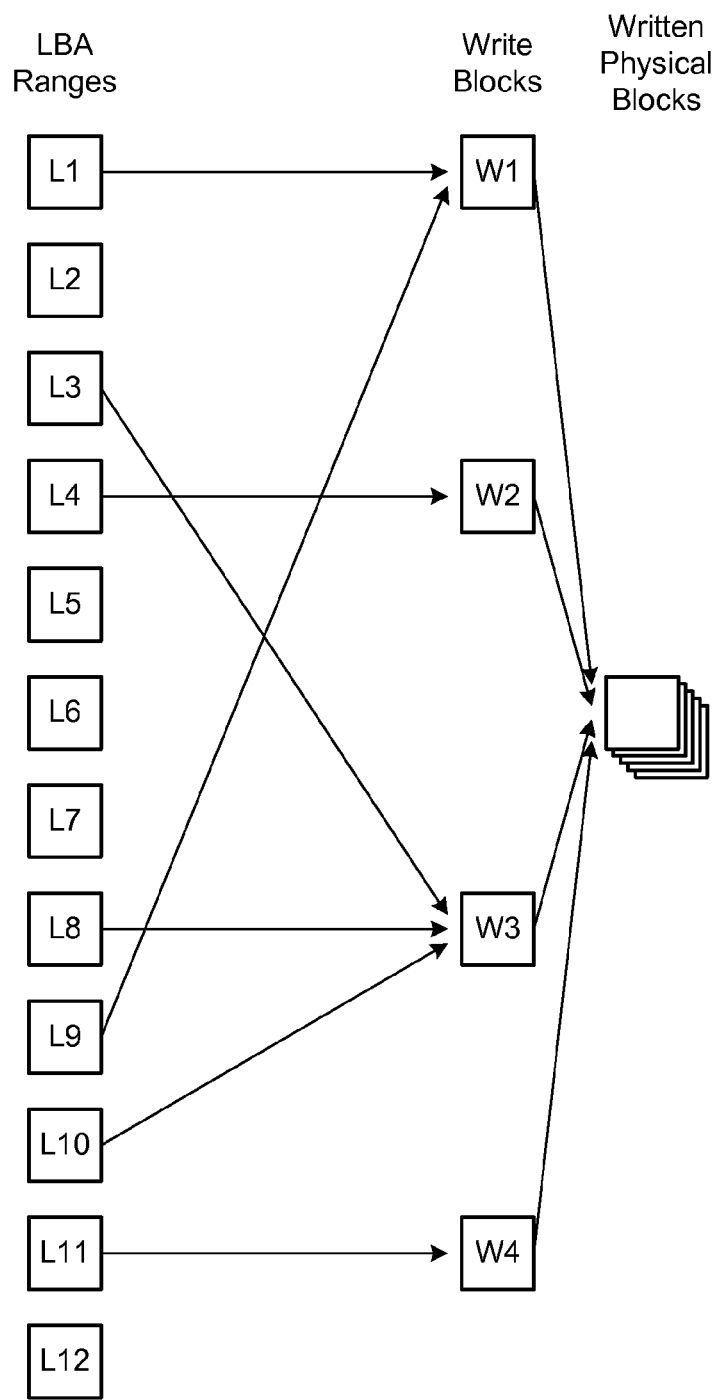
FIG. 4 illustrates exemplary assignments of logical block address ranges to physical write blocks.

FIG. 4 illustrates exemplary assignments of logical block address (LBA) ranges to physical write blocks according to an embodiment. An exemplary data management scheme that may be used with the memory system 102, also referred to as storage address remapping, operates to take LBAs associated with data sent by the host and remaps them to a second logical address space or directly to physical address space in an order the data is received from the host. Storage address remapping is described in U.S. patent application Ser. No. 12/036,014, filed Feb. 22, 2008, entitled "Method and System for Storage Address Re-Mapping for a Memory Device", which is hereby incorporated herein by reference. Each LBA corresponds to a sector, which is the minimum unit of logical address space addressable by a host. A host will typically assign data in clusters that are made up of one or more sectors. Also, in the following discussion, the term block is a flexible representation of storage space and may indicate an individual erase block or, as noted above, a logically interconnected set of erase blocks defined as a metablock. If the term block is used to indicate a metablock, then a corresponding logical block of LBAs should consist of a block of addresses of sufficient size to address the complete physical metablock.

Data to be written from the host system 100 to the memory system 102 may be addressed by clusters of one or more sectors managed in blocks. A write operation may be handled by writing data into a write block, and completely filling the write block with data in the order data is received, irrespective of the LBA of the data. A write block is created when the data is written to an unwritten block. A write block is always partially written because once a write block is full, it ceases being a write block. A write block may be filled in a single write operation or incrementally in a series of write operations. By writing data to the write block in the order it is received regardless of the LBA of the data, data is written in completed blocks by creating blocks with only unwritten capacity by means of flushing operations on partially obsolete blocks containing obsolete and valid data. A flushing operation may include relocating valid data from a partially obsolete block to another block, for example.

To minimize LBA fragmentation and the write amplification ratio, the memory system 102 assigns LBA ranges to a particular write block exclusively or non-exclusively. The LBA ranges are assigned to write blocks such that data is written in the order received to a particular write block according to the LBA of the data while minimizing the number of write blocks. The assignments are based on the existence of previously assigned write blocks and/or the availability of unwritten blocks. Data written from a host and data relocated during a flushing operation are treated identically when assigning a write block. In some embodiments, separate write blocks may exist for data written from a host and data relocated during a flushing operation. Regardless of the source of the data, LBA fragmentation is minimized because a write block in the memory system 102 is assigned based on the LBA range of the data and written to in the order the data is received. A desirable low write amplification ratio may result when sequentially addressed data is subsequently written to exclusive write blocks following writing of randomly addressed data.

LBA ranges may be assigned non-exclusively to write blocks. This may occur because the overhead for maintaining a write block for every LBA range may not be feasible, due to capacity constraints. For example, LBA ranges L1 and L9 in FIG. 4 are each assigned to write block W1. Similarly, LBA ranges L3, L8, and L10 are each assigned to write block W4. Therefore, data from multiple LBA ranges may be written to a non-exclusive write block. A write block may become non-exclusive when data to be written for a pending LBA range does not have a previously assigned write block and no unwritten blocks are available. In this case, a write block previously assigned to another LBA range or ranges may also be assigned to the pending LBA range. This situation may occur, for example, when there is too much unwritten space in partially written open write blocks, which prevents the availability of fully unwritten blocks. As another example, this situation may occur when the memory system cannot perform garbage collection, i.e., flushing operations, quickly enough to have available unwritten blocks.

The previously assigned write block may have been exclusive (assigned to a single LBA range) or may have already been non-exclusive (assigned to multiple LBA ranges). Selection of the previously assigned write block for assignment to the pending LBA range may be based on criteria such as least recent usage. Other criteria, such as the fewest number of LBA ranges already assigned to a write block, may be combined with least recent usage to select a previously assigned write block for assignment. When a previously assigned write block is assigned to another LBA range, unprogrammed capacity is utilized due to the assignment of a previously assigned write block to another LBA range. The number of write blocks in use therefore dynamically changes based on the availability of unwritten blocks.

In FIG. 4, LBA range L4 is assigned exclusively to write block W2, and LBA range L11 is assigned exclusively to write block W4, for example. An LBA range, e.g., a range of contiguous LBA addresses, may be assigned to an exclusive write block such that data associated with the LBA range is only written to that write block. An LBA range may include any number of LBAs but preferably includes the same number of sectors in a physical block. Data for an LBA range is written exclusively to a particular write block if that write block has been previously assigned to the LBA range. Data for an LBA range is also written exclusively to a particular write block if a write block has not been previously assigned to the LBA range but an unwritten block is available. In this case, the unwritten block may be exclusively assigned to the LBA range.

Figure 5:
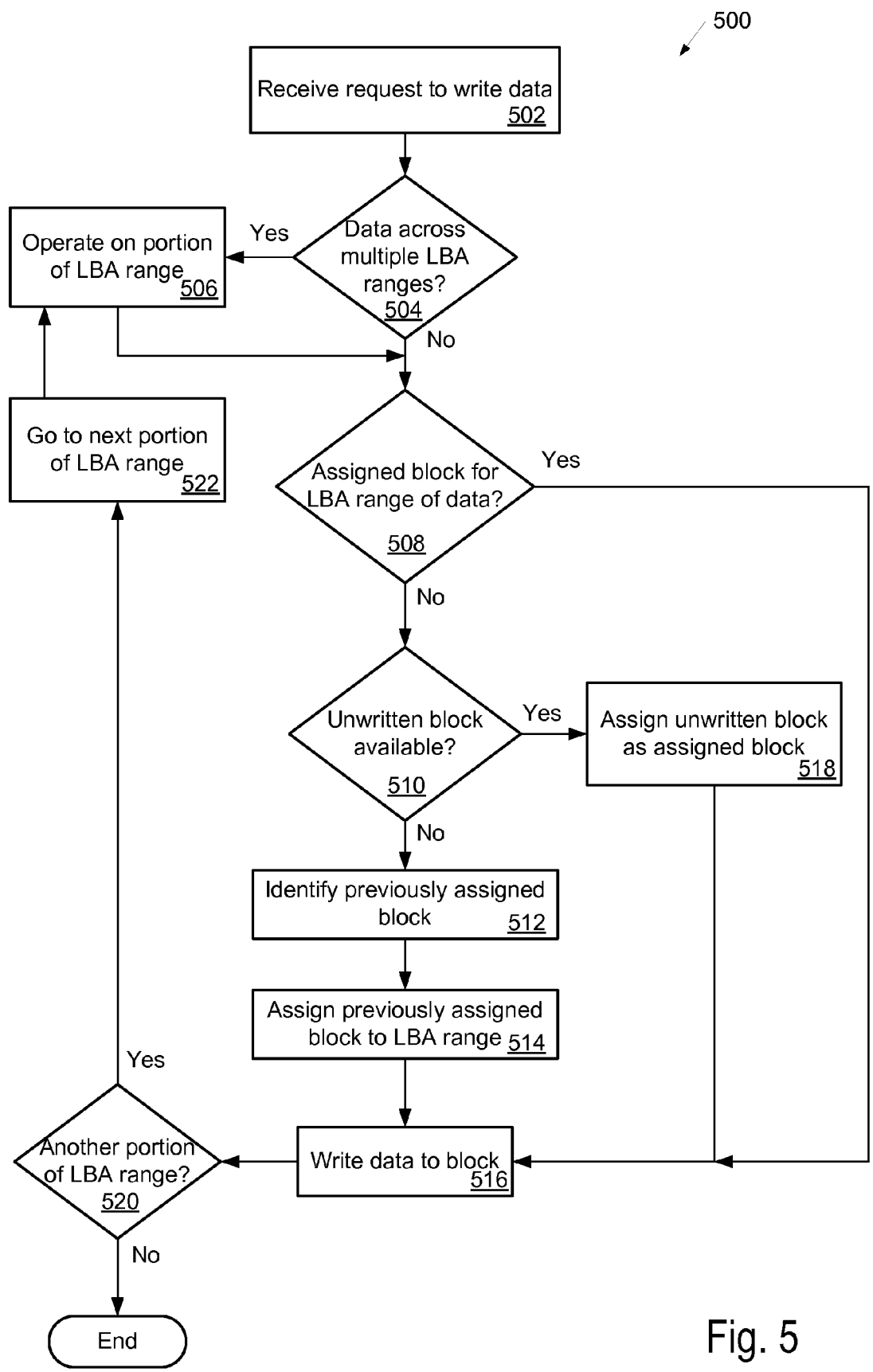
FIG. 5 is a flow diagram illustrating a method of dynamically mapping logical block address ranges to write blocks.

FIG. 5 is a flow diagram illustrating a method 500 of dynamically assigning logical block address (LBA) ranges to write blocks according to an embodiment. The method 500 assigns LBA ranges to a particular write block exclusively or non-exclusively to write data to the particular write block according to the associated LBA of the data. The data is written to the particular write block in the order it is received. The memory controller 114 in the memory system 102 may implement the method 500, for example. The assignments are based on the existence of assigned write blocks and/or the availability of unwritten blocks. Each of the write blocks therefore corresponds to one or more LBA ranges, each including a range of contiguous LBA addresses. Each of the steps described in FIG. 5 for the method 500 may be performed alone or in combination with other steps.

At step 502, a request to write data is received. A host 100 may send the request to the memory system 102 or the request may be received internally in the memory system 102 to write data relocated during a flushing operation. The data to be written has an LBA that may include a starting address and an offset or length. Whether the data to be written is included in more than one LBA range is examined at step 504. Data may be included in multiple LBA ranges if, for example, a portion of the data is in one LBA range and another portion of the data is in the next contiguous LBA range. The memory controller 114 may determine if the data is included in more than one LBA range by comparing the starting address and offset or length with predetermined LBA ranges. If the data to be written is included in more than one LBA range at step 504, each portion of the data is separately written for each respective LBA range. The initial LBA portion is selected for writing at step 506, and the method 500 continues to step 508. However, if the data to be written is in a single LBA range at step 504, the method continues directly to step 508.

LBA ranges may be dynamically assigned to a write block depending on the existence of previously assigned write blocks and/or the availability of unwritten blocks. If a write block is already assigned for writing data for the LBA range associated with the data to be written at step 508, then the data is written to that write block at step 516. The controller 114 may access a data structure 600, such the one shown in FIG. 6, to determine whether an assigned write block exists for the LBA range for the data to be written at step 508. The controller 114 may perform a binary search of the data structure 600, for example, to find whether an assigned write blocks exists for the LBA range. The data may be written into the flash memory 112 at step 516. However, as discussed above, if it is determined at step 504 that the data to be written is included in more than one LBA range, then the LBA range examined at step 508 is the selected LBA portion.

Figure 6:
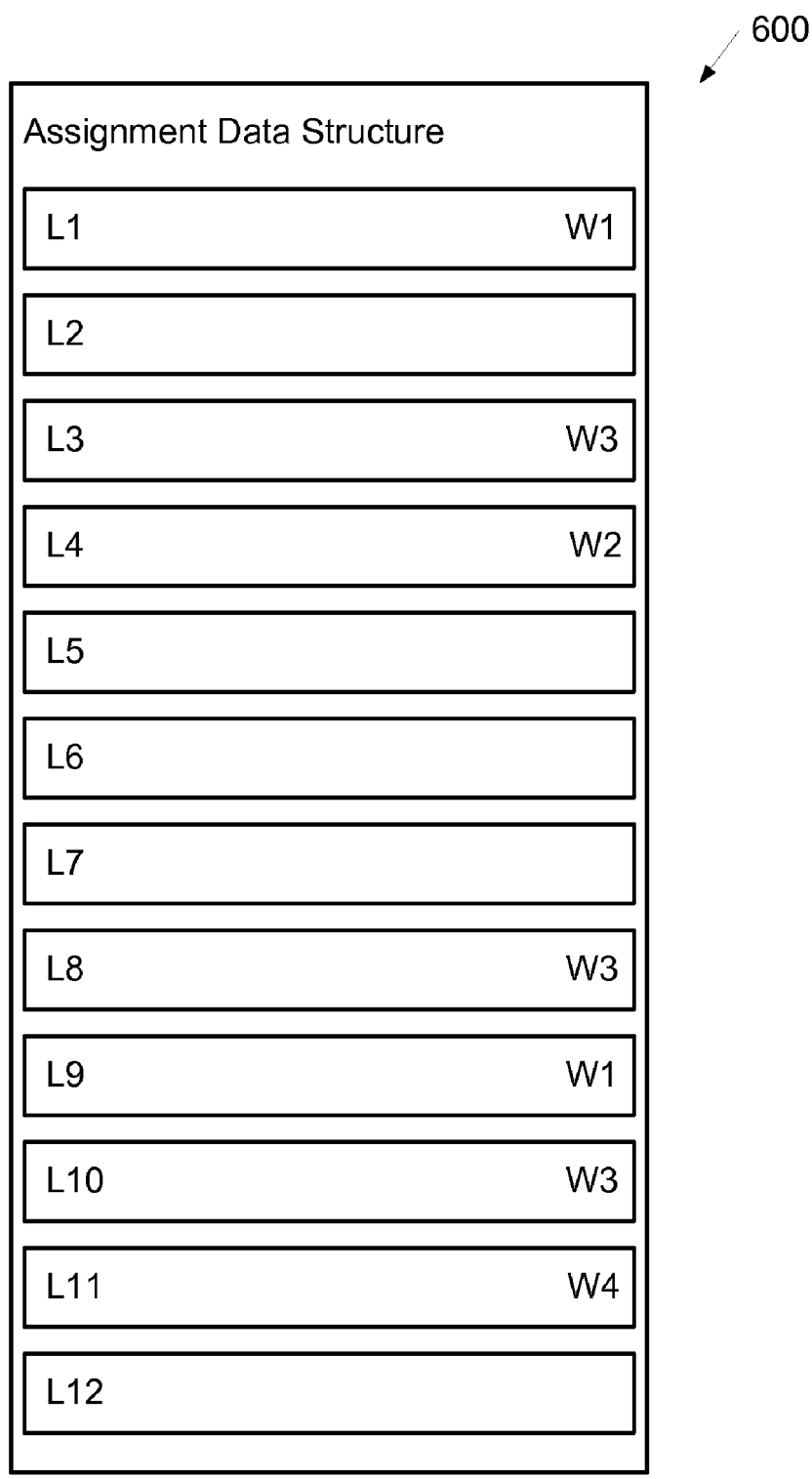
FIG. 6 illustrates an exemplary data structure for assigning write blocks to logical block address ranges.

If a write block is not already assigned for writing data for the LBA range associated with the data to be written at step 508, then the method 500 continues to step 510. A write block may not be already assigned for the LBA range if the data to be written is the first piece of data for the LBA range, for example. At step 510, it is determined whether an unwritten block is available. The memory controller 114 may access a data structure that tracks the availability of unwritten blocks in the memory 112. If an unwritten block is available at step 510, then the unwritten block is assigned as the write block for the specified LBA range at step 518, and the data is written to the newly assigned write block at step 516. This newly assigned write block is assigned exclusively to the specified LBA range. The controller 114 may designate the write block as assigned to the specified LBA range by updating a data structure 600, as shown in FIG. 6, for example.

An unwritten block may not be available at step 510 due to the memory device being full or nearly full. Unwritten blocks may also be unavailable if too much unwritten space is in partially written open write blocks or if garbage collection cannot be performed quickly enough. In this case, the method 500 continues to step 512 where a previously assigned block is identified to be additionally assigned to the LBA range of the data to be written. The previously assigned write block may have been exclusively or non-exclusively assigned prior to step 512. Selection of the previously assigned write block for assignment to the LBA range may be based on least recent usage or other criteria, such as the fewest number of LBA ranges already assigned to the write block. Data structures 700 and 702, such as the ones in FIG. 7, may contain information on the usage of write blocks. The controller 114 may access the data structures 700 and 702 to determine the least recently used block, for example. The previously assigned write block is assigned for the specified LBA range at step 514, and the data is written to this block at step 516.

The method 500 optimizes the use of free capacity in the memory device by dynamically assigning write blocks to be exclusive or non-exclusive to particular LBA ranges. The number of write blocks in use increases and decreases based on the availability of unwritten blocks. For example, when data at a certain LBA range is deleted, its corresponding write block may be freed (if the write block was exclusive) and re-assigned to LBA ranges associated with subsequent data to be written.

As described previously, if the data to be written is included in more than one LBA range, then it is determined at step 520 whether another portion of the data still needs to be written. For example, if the data to be written is in two contiguous LBA ranges, a first iteration of the method 500 writes the first portion of the data in the first LBA range, and a second iteration of the method 500 writes the second portion of the data in the next LBA range. If it is determined that another portion of data needs to be written at step 520, then the next portion is selected and operated on at steps 522 and 506. If no more portions of data need to be written at step 520, e.g., the data is in a single LBA range, then the method 500 is complete.

FIG. 6 illustrates an exemplary data structure 600 for assigning write blocks to logical block address ranges. The data structure 600 records assignments of the write blocks to particular LBA ranges. An entry in the data structure 600 exists for each LBA range to define a currently assigned write block, if any. When a new write block is assigned or when a write block becomes full, the entry for the particular LBA range is updated to reflect the change. The exemplary data structure 600 in FIG. 6 mirrors the LBA range assignments to write blocks as shown in FIG. 4. In particular, LBA ranges L4 and L11 are assigned exclusively to write blocks W2 and W4, respectively. LBA ranges L1 and L9 are both assigned to write block W1, and LBA ranges L3, L8, and L10 are each assigned to write block W4. In some embodiments, the data structure 600 may include only entries for LBA ranges that are currently assigned to write blocks.

Figure 7:
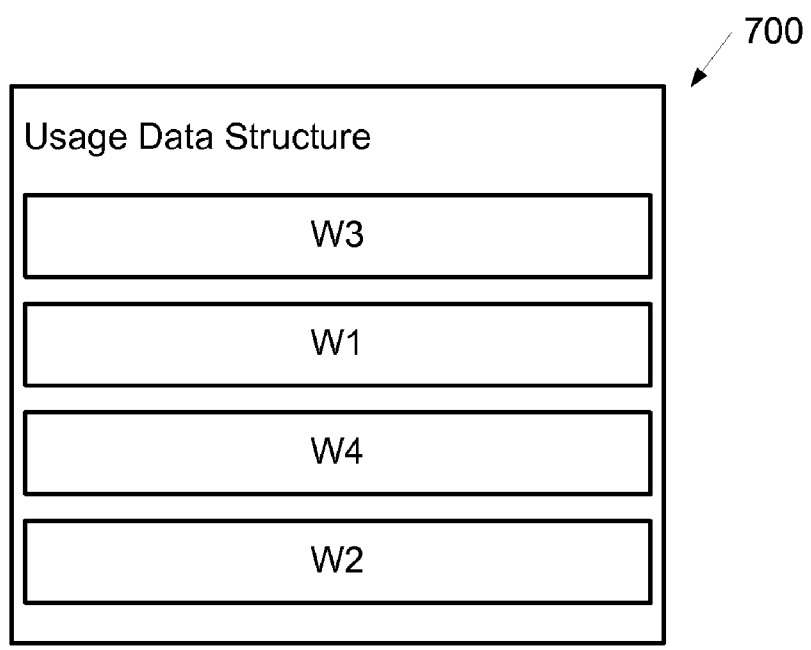
FIG. 7 illustrates an exemplary data structure for tracking usage of write blocks.
Figure 7:
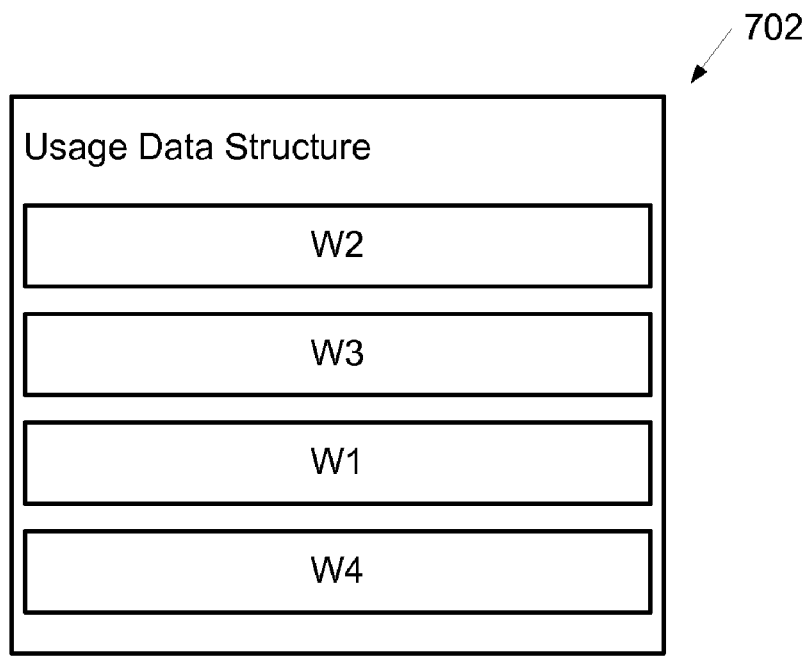

FIG. 7 illustrates exemplary data structures 700 and 702 for tracking usage of write blocks. The data structures 700 and 702 record a chain of write blocks in order of usage. When a write block previously assigned to one LBA range is to be assigned to another LBA range (e.g., at steps 512 and 514 of FIG. 5), the memory device may access the data structure 700 to determine and select the previously assigned block that is the least recently used. The data structure 700 shows exemplary entries of write blocks W3, W1, W4, and W2 in order of most recent use. In the data structure 700, for example, write block W3 is the most recently used. Therefore, if a previously assigned block needs to be selected to be assigned to another LBA range, write block W2 would be selected because it is the least recently used block. After data is written to the write block W2, the data structure 700 is updated to reflect that write block W2 is most recently used. Data structure 702 shows the entries of write blocks W2, W3, W1, and W4 in order of most recent use after write block W2 is written. In the data structures 700 and 702, an entry exists for each write block, and a particular write block entry is moved to the top of the data structure 700 whenever data is written to the corresponding write block.

In a memory including two bits per cell, also known as a D2 memory, a host may write to the memory one page at a time. A D2 memory system incorporating the concepts in FIGS. 4 and 5 may include a main storage area that stores the write blocks assigned to specified LBA ranges, as described previously. The main storage area may be a multi-level cell flash memory and be compatible with programming sequences for D2 memory. In contrast, memories may include more than two bits per cell, such as three bits per cell (D3 memory) or four bits per cell (D4 memory).

Figure 8:
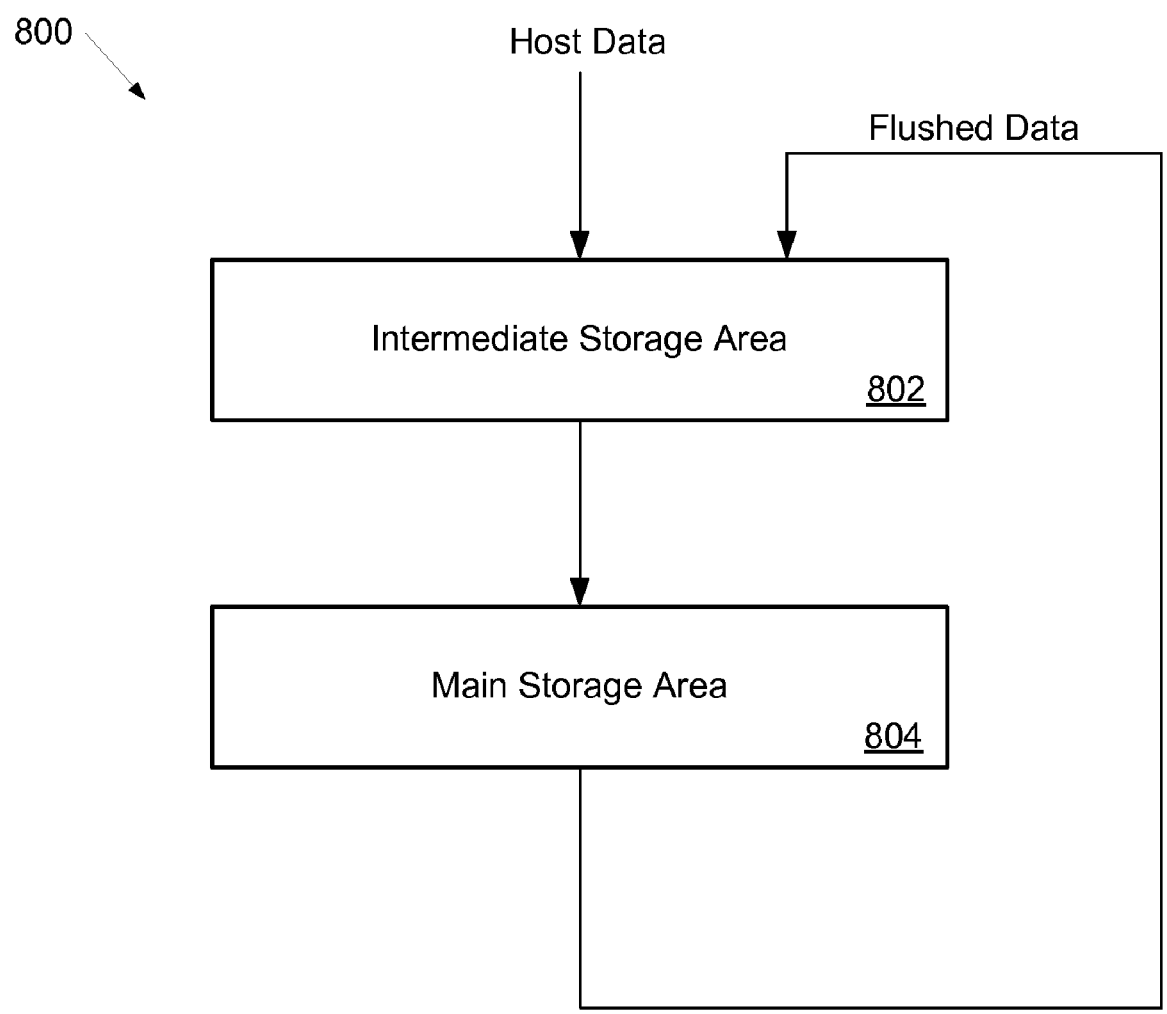
FIG. 8 shows an embodiment of a system of dynamically mapping logical block address ranges to write blocks when using an intermediate storage area and a main storage area.
Figure 9:
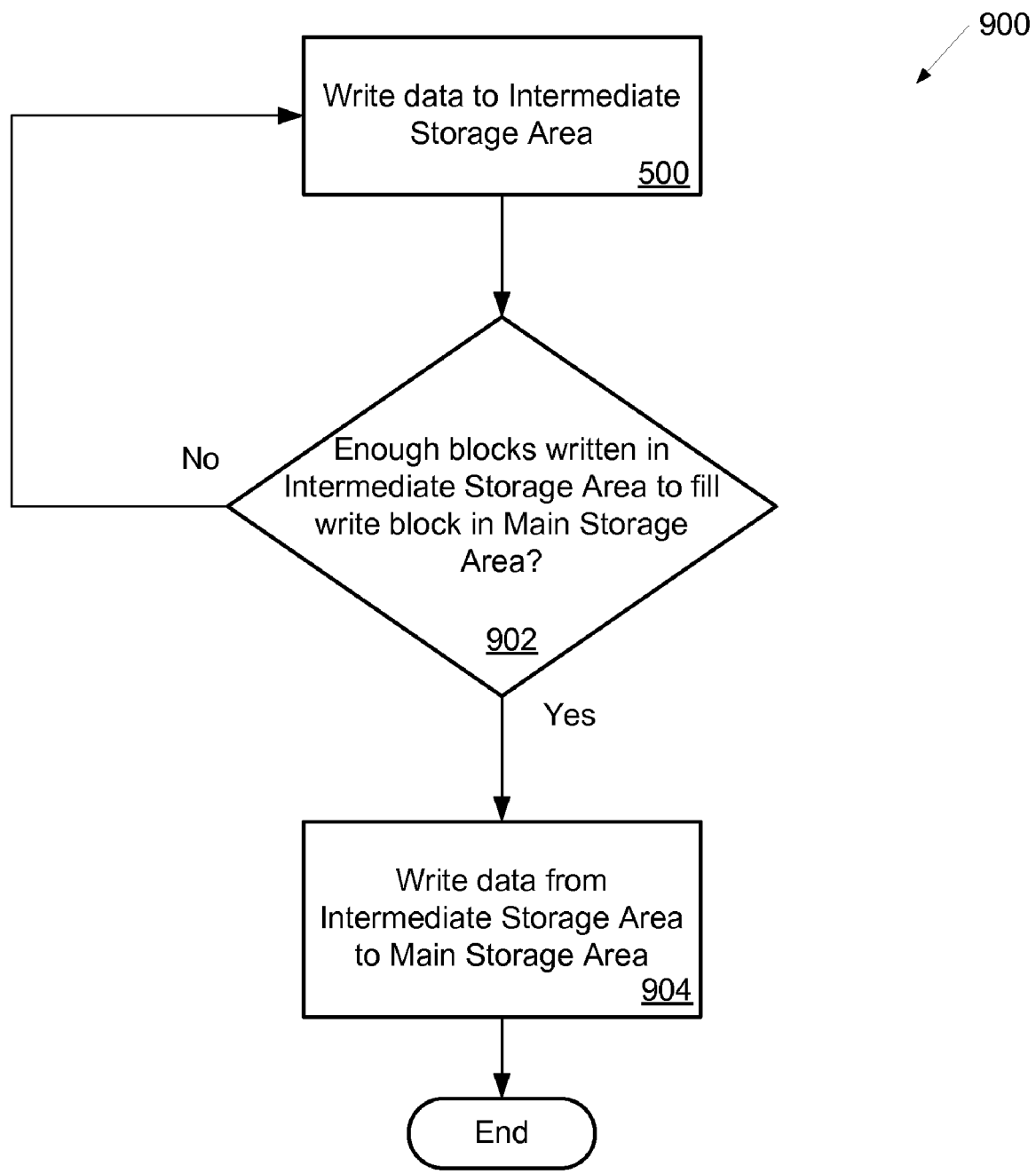
FIG. 9 is a flow diagram illustrating a method of dynamically mapping logical block address ranges to write blocks when using an intermediate storage area and a main storage area.

FIG. 8 shows an embodiment of a system 800 of dynamically mapping logical block address ranges to write blocks for memories including an intermediate storage area and a main storage area. FIG. 9 is a flow diagram illustrating a method 900 of dynamically mapping logical block address ranges to write blocks for memories including an intermediate storage area and a main storage area. In the system 800, both data written from a host and flushed data from garbage collection operations are written to write blocks in the intermediate storage area 802.

D2, D3, and D4 memories may include an intermediate storage area 802 and a main storage area 804. D2 memories may include layered storage areas in order to take advantage of faster writing to binary flash memory in the intermediate storage area 802. Layered storage areas may be utilized in D3 and D4 memories because data is written in larger chunks to the main storage area 804. In particular, D3 and D4 memories are typically programmed more than one page at a time, in multiple write operations, or in an order different from the addressing order.

In memories with layered storage areas, the main storage area 804 ultimately contains a consolidation of the written data, while the intermediate storage area 802 temporarily stores the write blocks assigned to specified LBA ranges as in the method 500, described previously with respect to FIG. 5. The intermediate storage area 802 may be a binary flash memory and the main storage area 804 may be a multi-level cell flash memory. Block sizes in the intermediate storage area 802 may differ from the block sizes in the main storage area 804. For example, the main storage area 804 could have four, eight, or sixteen times the capacity of the intermediate storage area 802.

As write blocks in the intermediate storage area 802 are written, enough filled write blocks in the intermediate storage area 802 may fill a single write block in the main storage area 804. If the requisite number of write blocks in the intermediate storage area 802 is reached at step 902, the write blocks are consolidated in the main storage area 804 at step 904. If the requisite number of write blocks is not reached at step 902, data continues to be written as in the method 500. In some embodiments, data from the intermediate storage area 802 may be consolidated into multiple write blocks in the main storage area 804.

Alternatively, as write blocks in the intermediate storage area 802 are written, enough data spread over multiple blocks in the intermediate storage area 802 may fill a single write block in the main storage area 804. The multiple blocks in the intermediate storage area 802 may be for the same LBA range, for example. If there is enough data in these multiple blocks in the intermediate storage area 802 at step 902, then this data is consolidated in the main storage area 804 at step 904. If there is not enough data in the intermediate storage area 802 at step 902, data continues to be written as in the method 500. In some embodiments, data from the intermediate storage area 802 may be consolidated into multiple write blocks in the main storage area 804.

While the method and system described above uses the LBA of data to be written for dynamic mapping of LBA ranges to write blocks, other attributes of the data may be used for allocating write blocks dynamically. For example, file size, file type, data type, and/or other attributes may be obtained from file tagging and data type tagging information. Such file types attributes may include metafiles, specific file types, and other attributes. Data types may include "premium data", temporary file data, directory data, and other attributes. The file tagging and data type tagging information may be transmitted along with the data, as described in U.S. patent application Ser. No. 12/030,018, filed Feb. 12, 2008, entitled "Method and Apparatus for Providing Data Type and Host File Information to a Mass Storage System", which is hereby incorporated herein by reference. As an example, it may not be desirable to mix longer sized files with shorter sized files, or temporary files with regular files in a particular write block. By examining file tagging and data type tagging information, data can be assigned to write blocks such that the desired data is kept together. Similar to the description above, data with certain attributes may be assigned exclusively or non-exclusively to write blocks.

A method and system has been disclosed for writing data to a memory device. The memory device assigns LBA ranges to a particular write block exclusively or non-exclusively for data to be written based on the existence of assigned write blocks and/or the availability of unwritten blocks. A non-exclusively assigned write block may be selected based on least recent usage or other criteria. Data written from a host and data relocated during a flushing operation are treated identically when assigning a write block. LBA fragmentation and write amplification ratio are minimized because a single write block is used based solely on the LBA range of the data. It is therefore intended that the foregoing detailed description be regarded as illustrative rather than limiting, and that it be understood that it is the following claims, including all equivalents, that are intended to define the spirit and scope of this invention.

I claim:

1. A method of writing data to a memory device having a plurality of memory blocks, comprising:
   (A) receiving a request to write data to the memory device, where the data has a logical block address (LBA) within a first LBA range;
   (B) determining whether a first assigned block exists in the plurality of memory blocks, the first assigned block assigned for writing data for the first LBA range;
   (C) if the first assigned block exists, writing the data to the first assigned block;
   (D) if the first assigned block does not exist and an unwritten block is available in the plurality of memory blocks:
      assigning the unwritten block as the first assigned block; and
      writing the data to the unwritten block; and
   (E) if the first assigned block does not exist and the unwritten block is not available in the plurality of memory blocks:
      identifying a second assigned block in the plurality of memory blocks, where the second assigned block is assigned for writing data for a second LBA range;
      assigning the second assigned block for writing data for both the first LBA range and the second LBA range; and
      writing the data to the second assigned block.

2. The method of claim 1, where identifying the second assigned block comprises identifying a least recently used block in the plurality of memory blocks.

3. The method of claim 2, where identifying the least recently used block comprises:
   reading a data structure comprising a list of the plurality of memory blocks in order of recent usage; and
   identifying a block that is least recently used from the list as the least recently used block.

4. The method of claim 1, where the data comprises data to be written from a host or data to be written for a garbage collection operation.

5. The method of claim 1, where determining whether the first assigned block exists comprises:
    reading a data structure comprising assignments of the first LBA range and the second LBA range to the plurality of memory blocks; and
    determining whether the first LBA range has been assigned to the first assigned block.

6. The method of claim 1, further comprising if the first assigned block does not exist and the unwritten block is available, recording in a data structure that the unwritten block is assigned as the first assigned block.

7. The method of claim 1, further comprising if the first assigned block does not exist and the unwritten block is not available, recording in a data structure that the second assigned block is assigned for writing data for both the first LBA range and the second LBA range.

8. The method of claim 1, where:
    the memory device comprises an intermediate storage area and a main storage area, the intermediate storage area comprising the plurality of memory blocks and the main storage area comprising a plurality of main storage memory blocks; and
    the method further comprises:
        consolidating data written to the plurality of memory blocks in the intermediate storage area; and
        writing the consolidated data from the intermediate storage area to a main storage write block of the plurality of main storage memory blocks in the main storage area.

9. The method of claim 8, where consolidating data comprises gathering data written to the first assigned block, the second assigned block, and the unwritten block to fill the write block of the plurality of main storage memory blocks.

10. The method of claim 1, further comprising:
    determining whether the data comprises a first portion within the first LBA range and a second portion within the second LBA range, the first and second LBA ranges being contiguous, following the step of receiving a request; and
    if the data comprises the first portion and the second portion, performing steps B and C for each of the first portion and the second portion.

11. A method of writing data to a memory device having a plurality of memory blocks, comprising:
    (A) receiving a request to write data to the memory device, where the data has a first attribute;
    (B) determining whether a first assigned block exists in the plurality of memory blocks, the first assigned block assigned for writing data with the first attribute;
    (C) if the first assigned block exists, writing the data to the first assigned block;
    (D) if the first assigned block does not exist and an unwritten block is available in the plurality of memory blocks:
        assigning the unwritten block as the first assigned block; and
        writing the data to the unwritten block; and
    (E) if the first assigned block does not exist and the unwritten block is not available in the plurality of memory blocks:
        identifying a second assigned block in the plurality of memory blocks, where the second assigned block is assigned for writing data with a second attribute;
        assigning the second assigned block for writing data for both the first attribute and the second attribute; and
        writing the data to the second assigned block.

12. The method of claim 11, where the first attribute and the second attribute comprise at least one of a file tagging attribute or a data type tagging attribute.

13. A memory device, comprising:
    a plurality of memory blocks; and
    a controller configured to:
        (A) receive a request to write data to the memory device, where the data has a logical block address (LBA) within a first LBA range;
        (B) determine whether a first assigned block exists in the plurality of memory blocks, the first assigned block assigned for writing data for the first LBA range;
        (C) if the first assigned block exists, write the data to the first assigned block;
        (D) if the first assigned block does not exist and an unwritten block is available in the plurality of memory blocks:
            assign the unwritten block as the first assigned block; and
            write the data to the unwritten block; and
        (E) if the first assigned block does not exist and the unwritten block is not available:
            identify a second assigned block in the plurality of memory blocks, where the second assigned block is assigned for writing data for a second LBA range;
            assign the second assigned block for writing data for both the first LBA range and the second LBA range; and
            write the data to the second assigned block.

14. The memory device of claim 13, where identifying the second assigned block comprises the controller being configured to identify a least recently used block in the plurality of memory blocks.

15. The memory device of claim 14, further comprising a data structure comprising a list of the plurality of memory blocks in order of recent usage and where identifying the least recently used block comprises the controller being configured to:
    read the data structure; and
    identify a block that is least recently used from the list as the least recently used block.

16. The memory device of claim 13, where the data comprises data to be written from a host or data to be written for a garbage collection operation.

17. The memory device of claim 13, further comprising a data structure comprising assignments of the first LBA range and the second LBA range to the plurality of memory blocks and where determining whether the first assigned block exists comprises the controller being configured to:
    read the data structure; and
    determine whether the first LBA range has been assigned to the first assigned block.

18. The memory device of claim 13, further comprising a data structure and where the controller is further configured to:
    if the first assigned block does not exist and the unwritten block is available, record in the data structure that the unwritten block is assigned as the first assigned block.

19. The memory device of claim 13, further comprising a data structure and where the controller is further configured to:
    if the first assigned block does not exist and the unwritten block is not available, record in the data structure that the second assigned block is assigned for writing data for both the first LBA range and the second LBA range.

20. The memory device of claim 13, further comprising an intermediate storage area comprising the plurality of memory blocks and a main storage area comprising a plurality of main storage memory blocks and where:
the controller is further configured to:
consolidate data written to the plurality of memory blocks in the intermediate storage area; and
write the consolidated data from the intermediate storage area to a main storage write block of the plurality of main storage memory blocks in the main storage area.

21. The memory device of claim 20, where consolidating data comprises the controller being configured to gather data written to the first assigned block, the second assigned block, and the unwritten block to fill the write block of the plurality of main storage memory blocks.

22. The memory device of claim 13, where the controller is further configured to:
determine whether the data comprises a first portion within the first LBA block and a second portion within the second LBA block, the first and second LBA blocks being contiguous, following receipt of the request; and
perform steps B and C for each of the first portion and the second portion.

\* \* \* \* \*